(12) United States Patent
Bien (10) Patent No.: US 11,384,911 B1
(45) Date of Patent: Jul. 12, 2022

(54) GUIDED LIGHT PREFERABLY INSERTED WITHIN A POST OR ANOTHER TUBULAR OBJECT

(71) Applicant: Franklin Bien, Englewood, FL (US)

(72) Inventor: Franklin Bien, Englewood, FL (US)

(*) Notice: Subject to any disclaimer, the term of this patent is extended or adjusted under 35 U.S.C. 154(b) by 0 days.

(21) Appl. No.: 17/121,405

(22) Filed: Dec. 14, 2020

Related U.S. Application Data

(63) Continuation-in-part of application No. 16/983,652, filed on Aug. 3, 2020, now abandoned, which is a continuation-in-part of application No. 16/579,478, filed on Sep. 23, 2019, now Pat. No. 10,989,379, which is a continuation-in-part of application No. 15/920,402, filed on Mar. 13, 2018, now Pat. No. 10,424,173, which is a continuation-in-part of application No. 29/640,209, filed on Mar. 12, 2018, now Pat. No. Des. 857,975.

(60) Provisional application No. 62/881,429, filed on Aug. 1, 2019, provisional application No. 62/470,615, filed on Mar. 13, 2017.

(51) Int. Cl.
| | |
|---|---|
| *G08G 3/00* | (2006.01) |
| *F21S 8/08* | (2006.01) |
| *F21S 9/03* | (2006.01) |
| *H02S 40/22* | (2014.01) |
| *H02S 40/38* | (2014.01) |
| *F21V 23/04* | (2006.01) |
| *F21Y 115/10* | (2016.01) |

(52) U.S. Cl.
CPC .............. *F21S 8/081* (2013.01); *F21S 9/037* (2013.01); *F21V 23/0464* (2013.01); *H02S 40/22* (2014.12); *H02S 40/38* (2014.12); *F21Y 2115/10* (2016.08)

(58) Field of Classification Search
USPC .... 340/984, 981, 979, 980, 990, 991, 425.5, 340/426.22, 455, 468, 539.22, 815.66
See application file for complete search history.

(56) References Cited

U.S. PATENT DOCUMENTS

| | | | | |
|---|---|---|---|---|
| 5,174,045 | A * | 12/1992 | Thompson | F26B 5/08 |
| | | | | 210/360.1 |
| 10,989,379 | B2 * | 4/2021 | Bien | E02D 5/22 |
| 2006/0130727 | A1 * | 6/2006 | Eischeid | E01F 9/617 |
| | | | | 114/219 |
| 2006/0272566 | A1 * | 12/2006 | Rueckert | B63B 3/06 |
| | | | | 114/263 |
| 2011/0225859 | A1 * | 9/2011 | Safavi | G09G 3/3611 |
| | | | | 40/448 |
| 2015/0217840 | A1 * | 8/2015 | Taylor | B63B 45/04 |
| | | | | 114/219 |
| 2019/0338700 | A1 * | 11/2019 | Sarder | F02B 63/044 |

\* cited by examiner

*Primary Examiner* — Daniel Previl
(74) *Attorney, Agent, or Firm* — Daniel S. Polley, P.A.

(57) ABSTRACT

A solar-powered post light preferably designed to fit snugly within an outer end of a tubular member, such as a pipe. By being lit at nighttime hours, the light provides a guide to boaters at a boatlift while centering their boat, as well as providing light for various other nighttime conditions related to the water, as well as outside of a water environment. The light preferably provides for a "glow" effect, such that at whatever visible distance, the boater will know where the boat lift is located. An upper angled member of the guide light can be provided with a plurality of facet cuts which provide for prismatic reflection of sun rays for solar collection 180 degrees across a horizon.

20 Claims, 12 Drawing Sheets

GUIDED LIGHT PREFERABLY INSERTED WITHIN A POST OR ANOTHER TUBULAR OBJECT

This application is a continuation-in-part of U.S. application Ser. No. 16/983,652, filed Aug. 3, 2020, which is a continuation-in-part of U.S. application Ser. No. 16/579,478, filed Sep. 23, 2019, which is a continuation-in-part of U.S. application Ser. No. 15/920,402, filed Mar. 13, 2018, now U.S. Pat. No. 10,424,173, which application is a continuation-in-part of U.S. application Ser. No. 29/640,209, filed Mar. 12, 2018, now U.S. Design Pat. No. D857,975, and also claims the benefit of and priority to U.S. Application Ser. No. 62/470,615, filed Mar. 13, 2017. The instant application also claims the benefit of and priority to U.S. Application Ser. No. 62/881,429, filed Aug. 1, 2019. All of the above-identified applications are incorporated by reference in their entireties for all purposes.

1. FIELD OF THE DISCLOSURE

The disclosure relates generally to outdoor lighting and more particularly to outdoor lighting use around a marine environment.

2. BACKGROUND

Docking on boatlifts at night is difficult, especially centering a boat, as well as just locating the boatlift at nighttime. Furthermore, long periods of time on water after dark cause the boater's eyes to become sensitive to light, Past attempts to address these problems have use a hard-wired light. However, the hard-wired light does not function long, since the guideposts are partially submerged in water, and a wired light would need to have wires in the water.

The below disclosed novel light is directed to addressing the above noted problems.

SUMMARY OF THE DISCLOSURE

Disclosed is novel solar-powered post light which is preferably designed to fit snugly within an outer end of a tubular member, such as a pipe. By being lit at nighttime hours, the light provides a guide to boaters at a boatlift while centering their boat, as well as providing light for various other nighttime conditions related to the water, as well as outside of a water environment.

In one non-limiting embodiment, the insertion end of the light preferably fits snuggly into a 2-inch PVC pipe that is commonly found or used with many boat lifts. Other pipe or tube dimensions can also be used and are all considered within the scope of the disclosure. The novel disclosed post light turns direct and indirect light into energy.

The novel guide lite can be seen from relatively long distances, while not being blinding to the boater or other viewer while viewing close up. The light preferably provides for a "glow" effect, such that at whatever visible distance, the boater will know where the boat lift is located.

Thus, in one preferred, though non-limiting, use, the novel guide light(s) allow a user to make their boat lift and dock more visible during nighttime hours. With the use of two guide lights, the user will find it much easier to center their boat on the boat lift.

In addition to aiding in centering a boat on a boatlift, use of the guide lights will also make the boat lift visible to all other boaters that happen to be on the water after sunset, which will aid in reducing marine accidents.

The novel guide lights can be installed to their chosen post within minutes. In one non-limiting installation embodiment, the bottom insertion end is sized to slip or be received within the opening of the tube/post, such as, without limitation, a 2-inch PVC pipe on a boat lift and can then be held in place with a setting screw screwed through the pipe to make contact with the inserted bottom end of the guide light.

To allow for venting, a vent hole should also be drilled, such as, without limitation, preferably 3-inches below the top end of the pipe. For unvented posts, the guide light can be permanently glued to the post.

The novel guide light preferably works in any low light condition.

DETAILED DESCRIPTION

Figure 1:
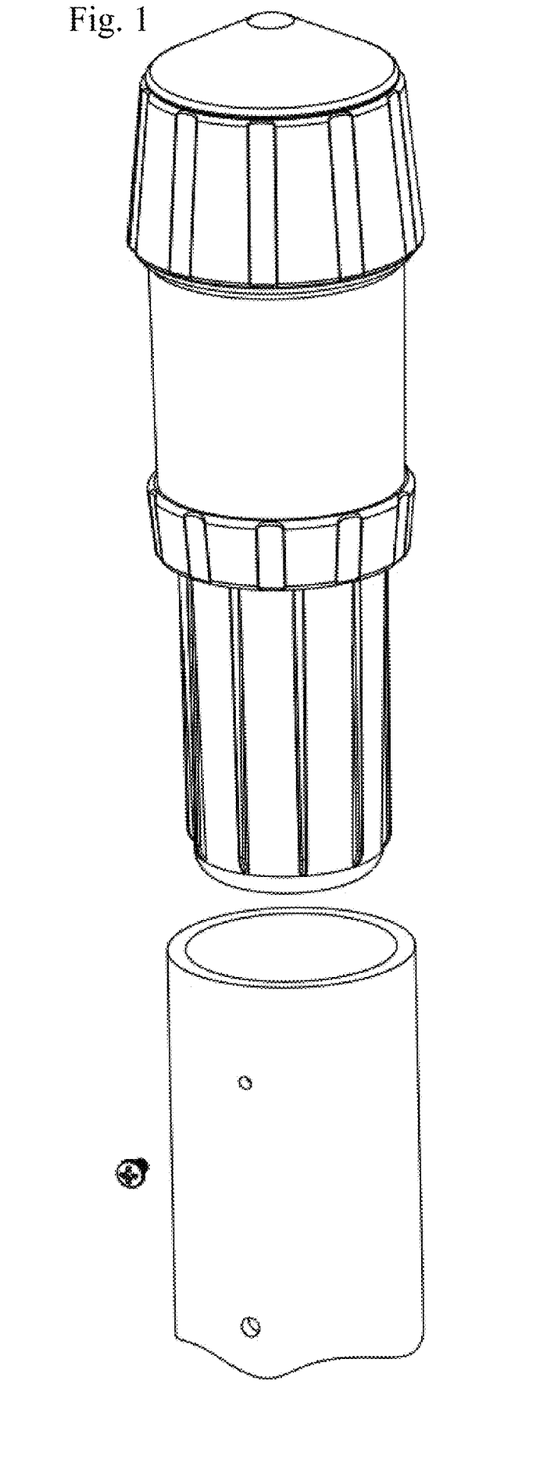
FIG. 1 is a perspective view showing a non-limiting embodiment of the novel guide light and an end portion of a tube or post that the novel guide light is to be partially disposed therein in accordance with the present disclosure.
Figure 2:
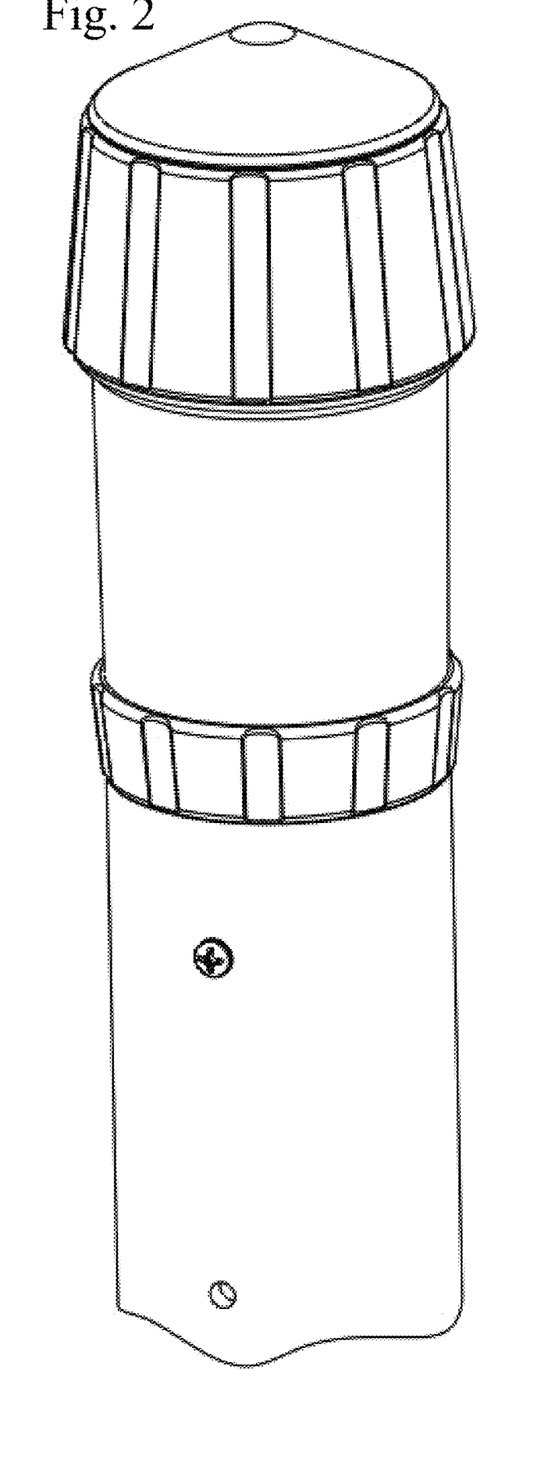
FIG. 2 is a perspective view showing the novel guide light of FIG. 1 partially disposed within and secured to an end portion of a tube or post in accordance with the present disclosure.
Figure 3:
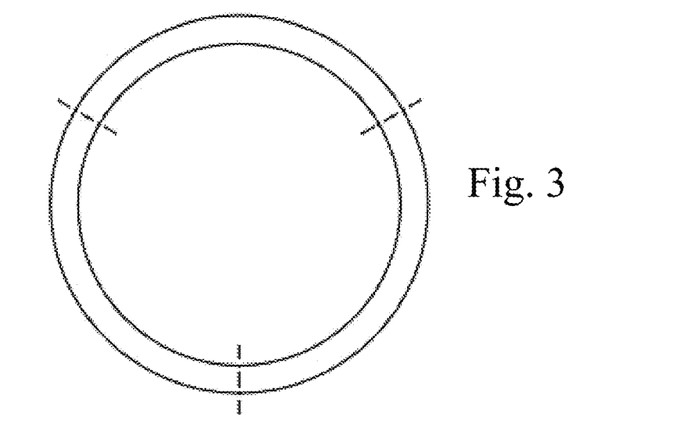
FIG. 3 is a top view of the end portion of the tube or post of FIG. 1.
Figure 4:
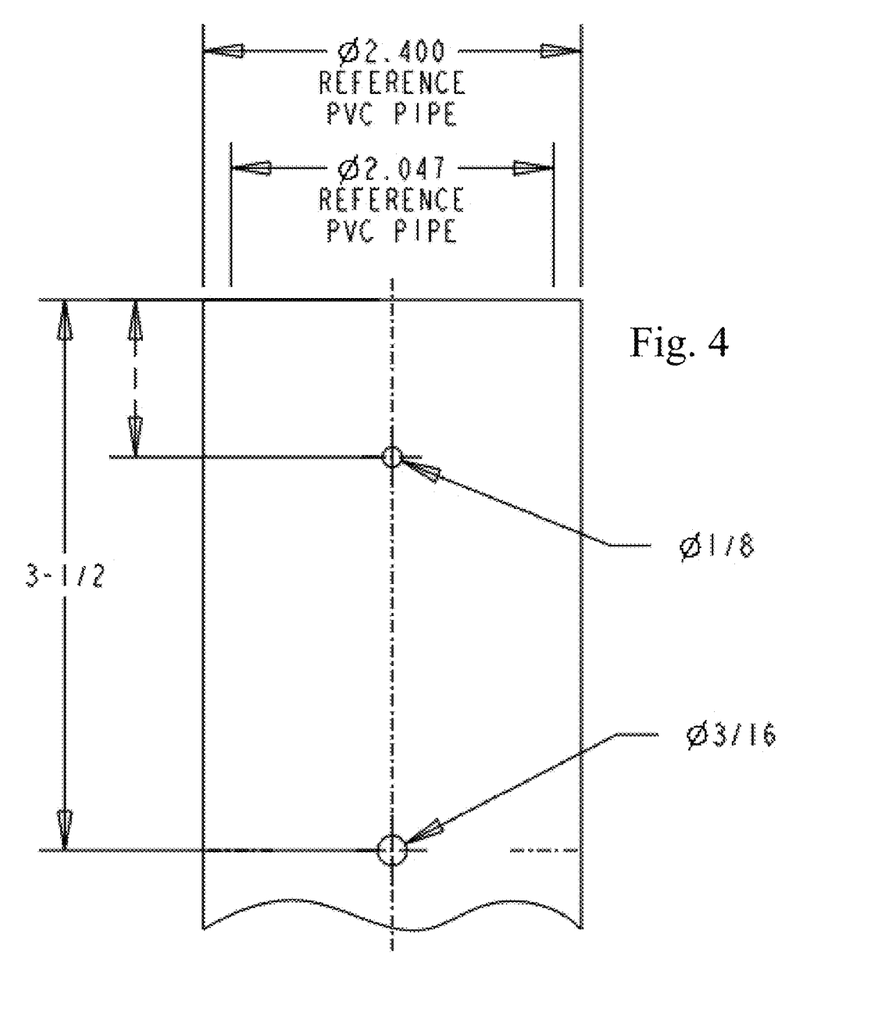
FIG. 4 is a side elevational view of the end portion of the tube or post of FIG. 1.
Figure 5:
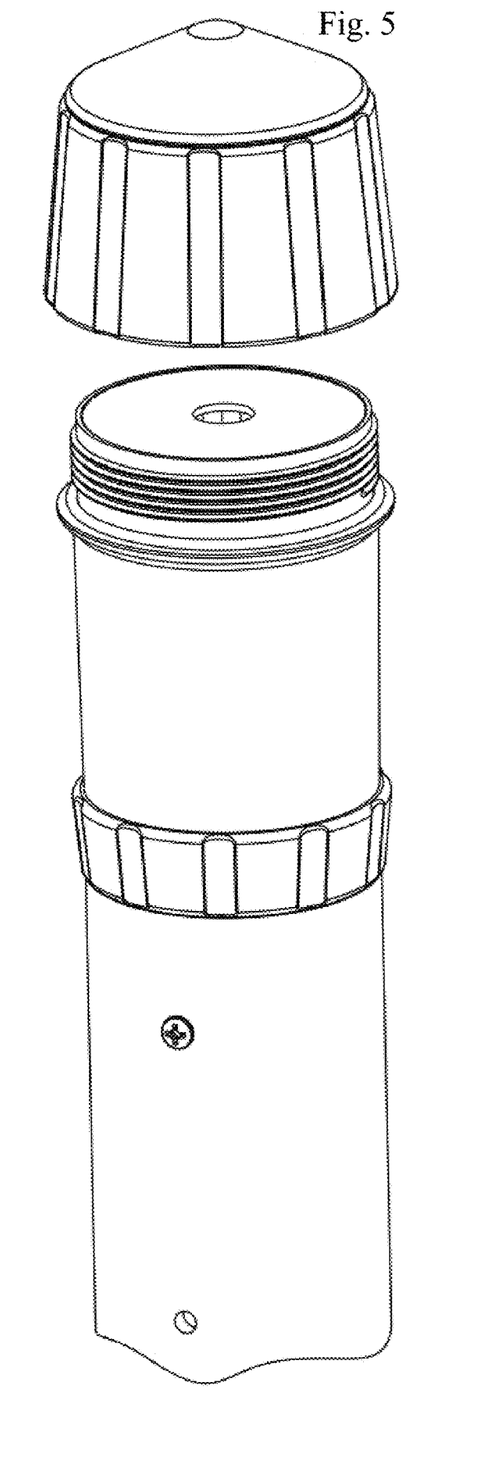
FIG. 5 is a perspective view showing the novel guide light of FIG. 1 partially disposed within and secured to an end portion of a tube or post while also showing a top portion of the guide light in an exploded view in accordance with the present disclosure.
Figure 6:
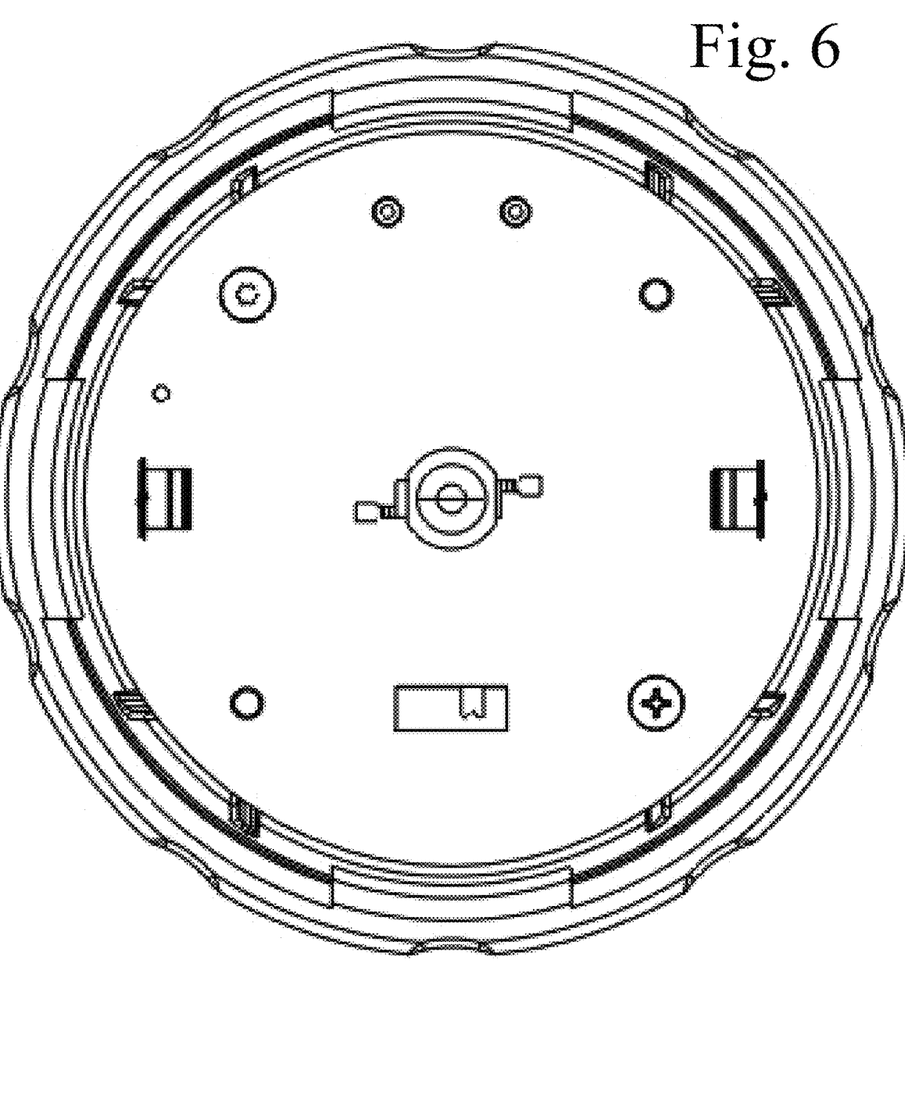
FIG. 6 is a bottom view of the top portion of the guide lite of FIG. 1.
Figure 7:
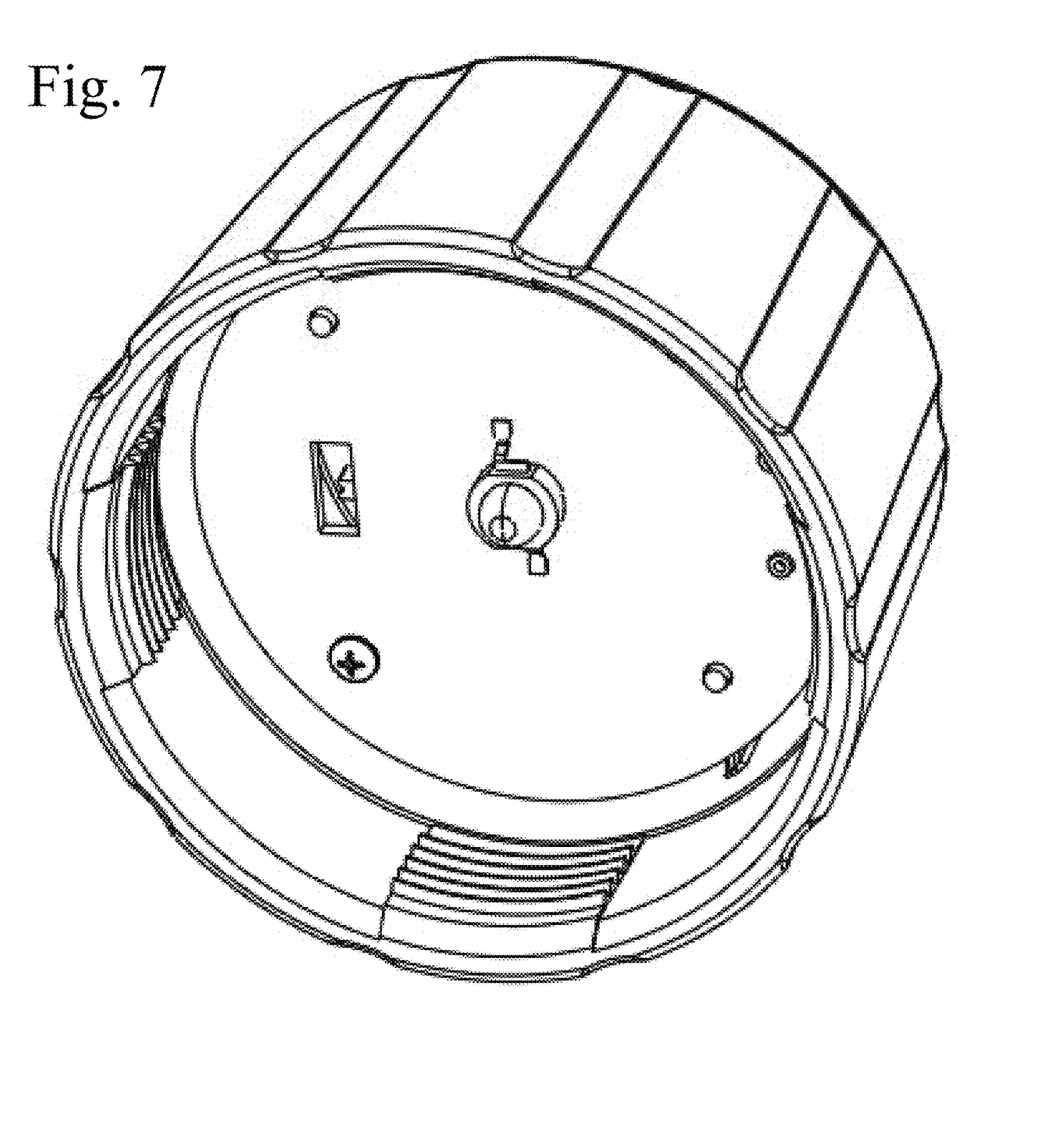
FIG. 7 is a bottom perspective view of the top portion of the guide light of FIG. 1.
Figure 8:
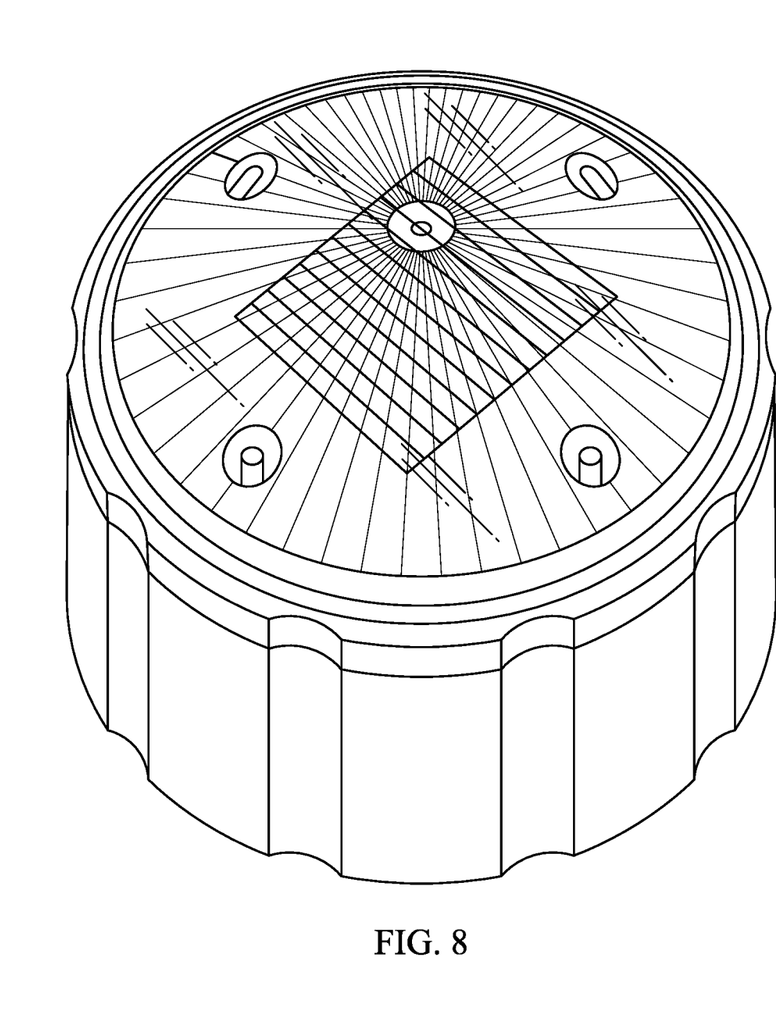
FIG. 8 is a top perspective view of the top portion of the guide light of FIG. 1.
Figure 9:
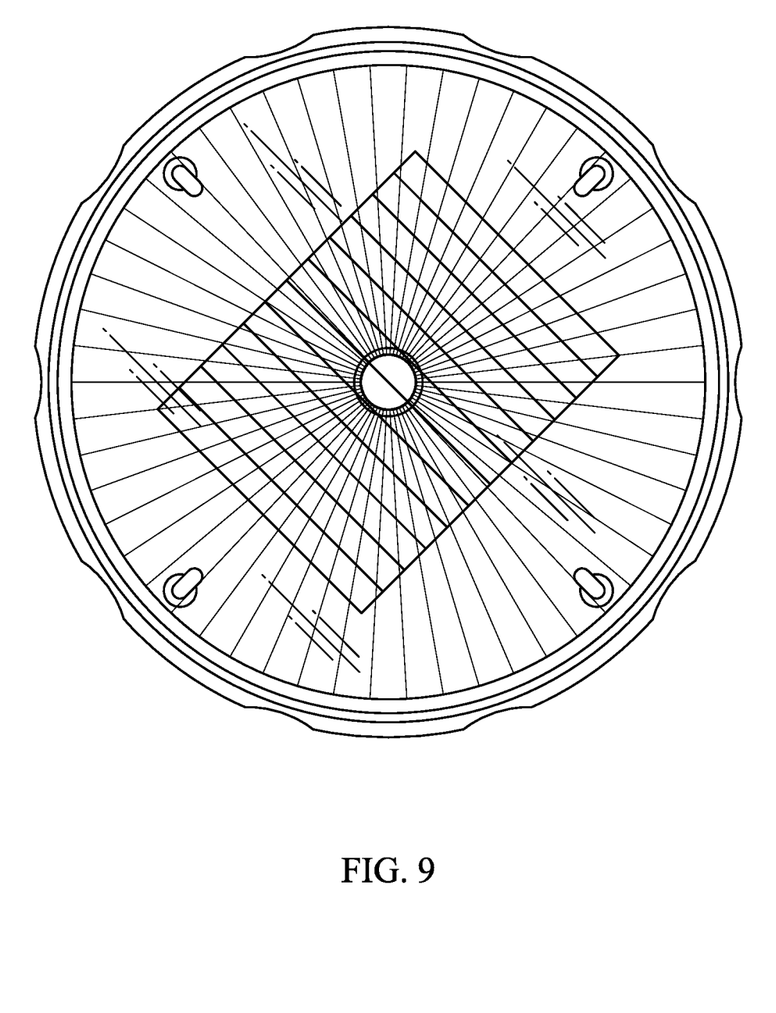
FIG. 9 is a top view of the top portion of the guide light of FIG. 1.
Figure 10:
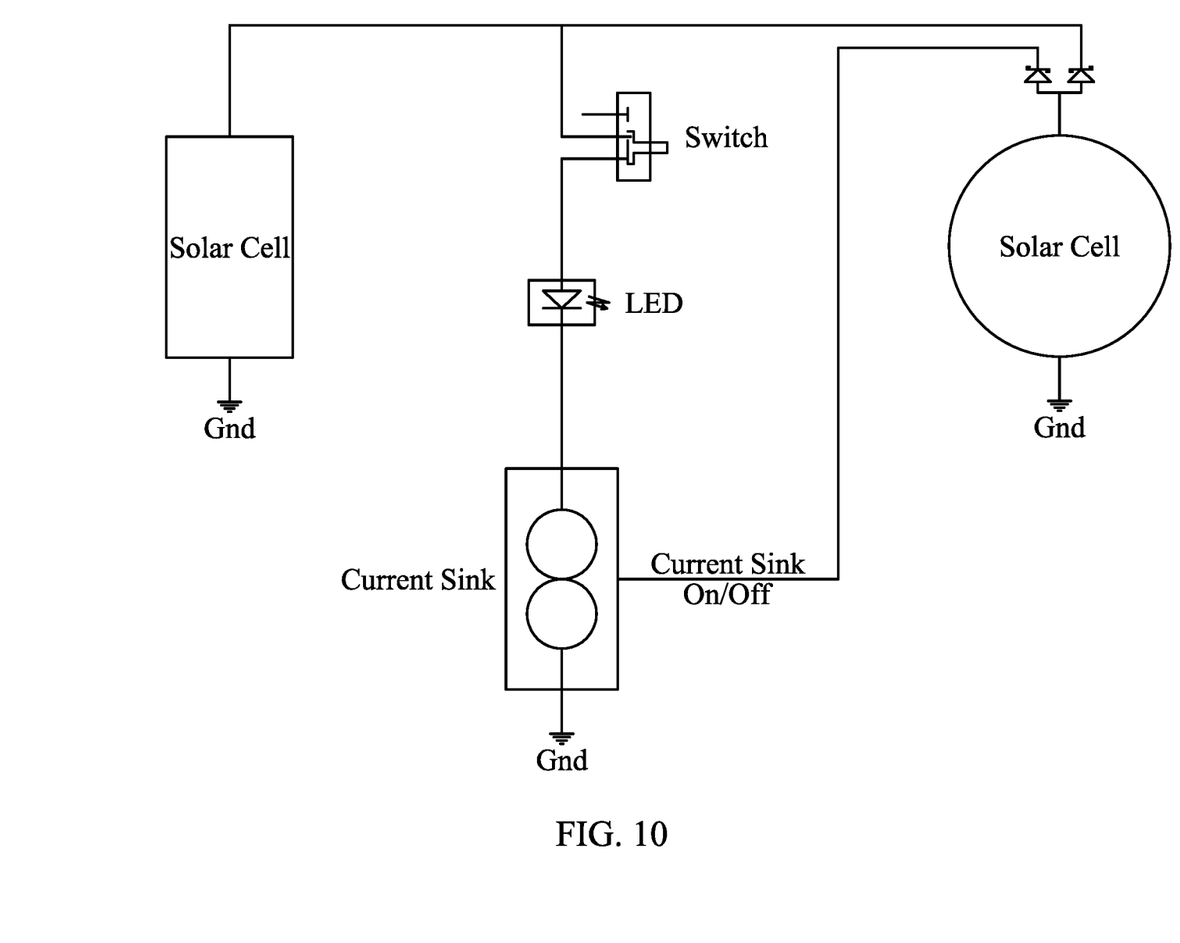
FIG. 10 is a non-limiting wiring diagram for the electronics of the novel guide light of FIG. 1 in accordance with the present disclosure.

FIGS. 1 through 9 show various views of a preferred non-limiting embodiment for the novel guide light or portions of the guide light, while FIG. 10 show a non-limiting wiring diagram/schematic for the electronics of the novel guide light.

The guide light preferably includes an insertion member an intermediate light display portion and a top member housing the solar panels and electronics, as well as the light elements that display their light downward so that the light is visible within the intermediate display portion. A portion of the top member is transparent and/or translucent to allow the sunlight to be used for recharging the battery. Though not limiting, the top member can be threadedly secured to one end of the intermediate light display portion (See FIGS. 5 and 7). An o-ring or gasket can also be provided with the threads of the intermediate light display portion to help ensure a watertight connection with the top member when the top member is threadedly secured thereto.

The novel guide light is preferably solar powered, so there is no need to have wires run out through water and posts. The insertion member of the guide light preferably fits snuggly within the interior of a 2-inch PVC pipe (in one non-limiting embodiment), and fit flush with sides.

The preferred solar-powered post guide light turns direct or indirect light into energy.

As best seen in FIGS. 8 and 9, the translucent/transparent portion of the top member can be provided with cuts/facets cuts to create a prismatic effect (i.e. prismatic solar reflection) for sun ray collection throughout the day. By allowing solar collection across the entire horizon, even collecting cloud reflection and indirect light by using faceted cuts in preferably plastic collector portion of the top end the light is ricochet into the solar panels housed within the top end. Solar panels can be commonly and preferably at plane with horizon, limiting photovoltaic generated power to hours of sun directly above. Thus, the prismatic collection achieved through the internal facet cuts (See FIGS. 11-13) in the plastic (or other transparent or translucent material) enclosure gathers the rays and focuses them to the panel collector, similar to a funnel and liquid.

Figure 11:
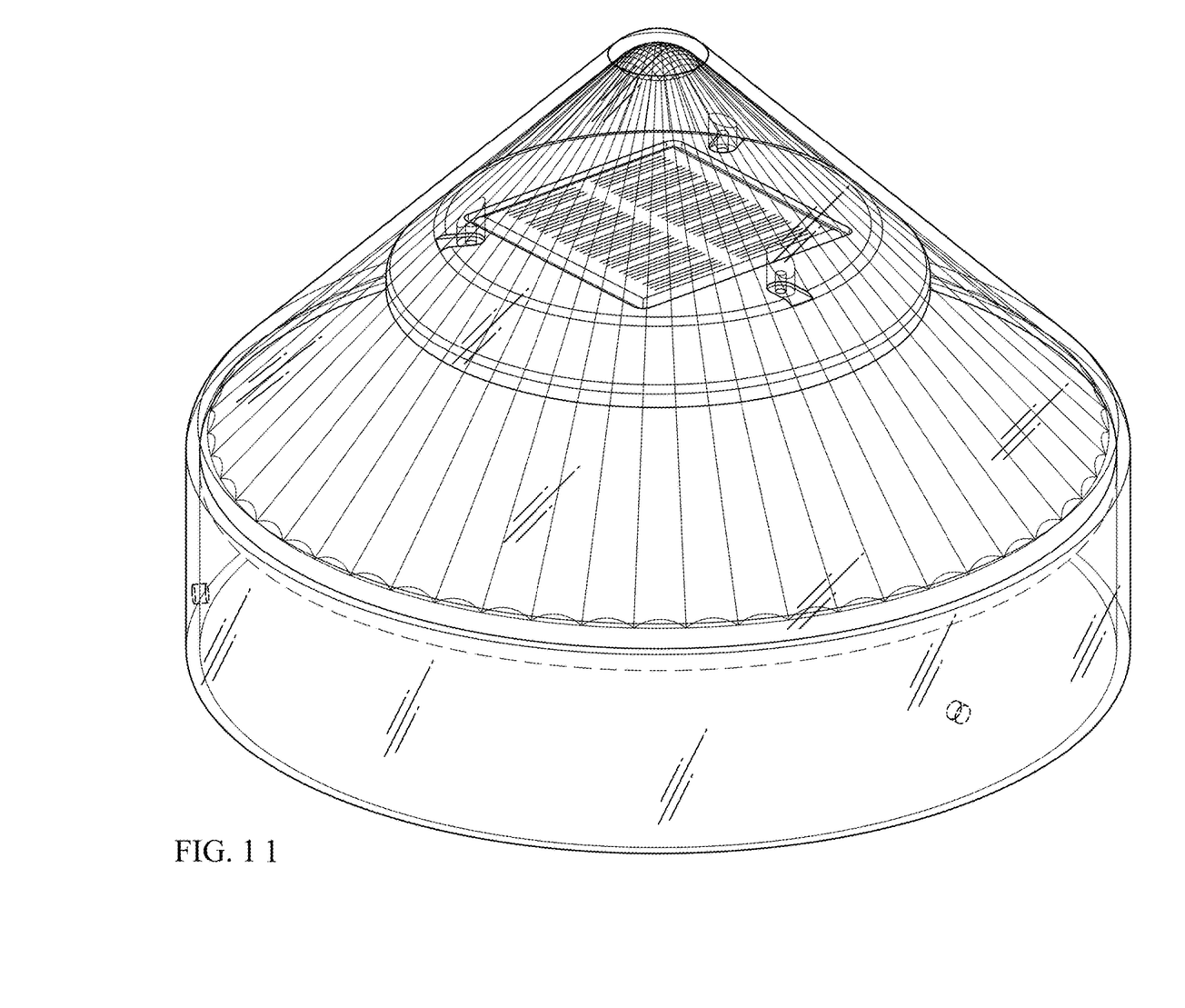
FIGS. 11, 12 and 13 show additional views of the top enclosure/top portion and the facet cuts in the top enclosure/top portion in accordance with the present disclosure.
Figure 12:
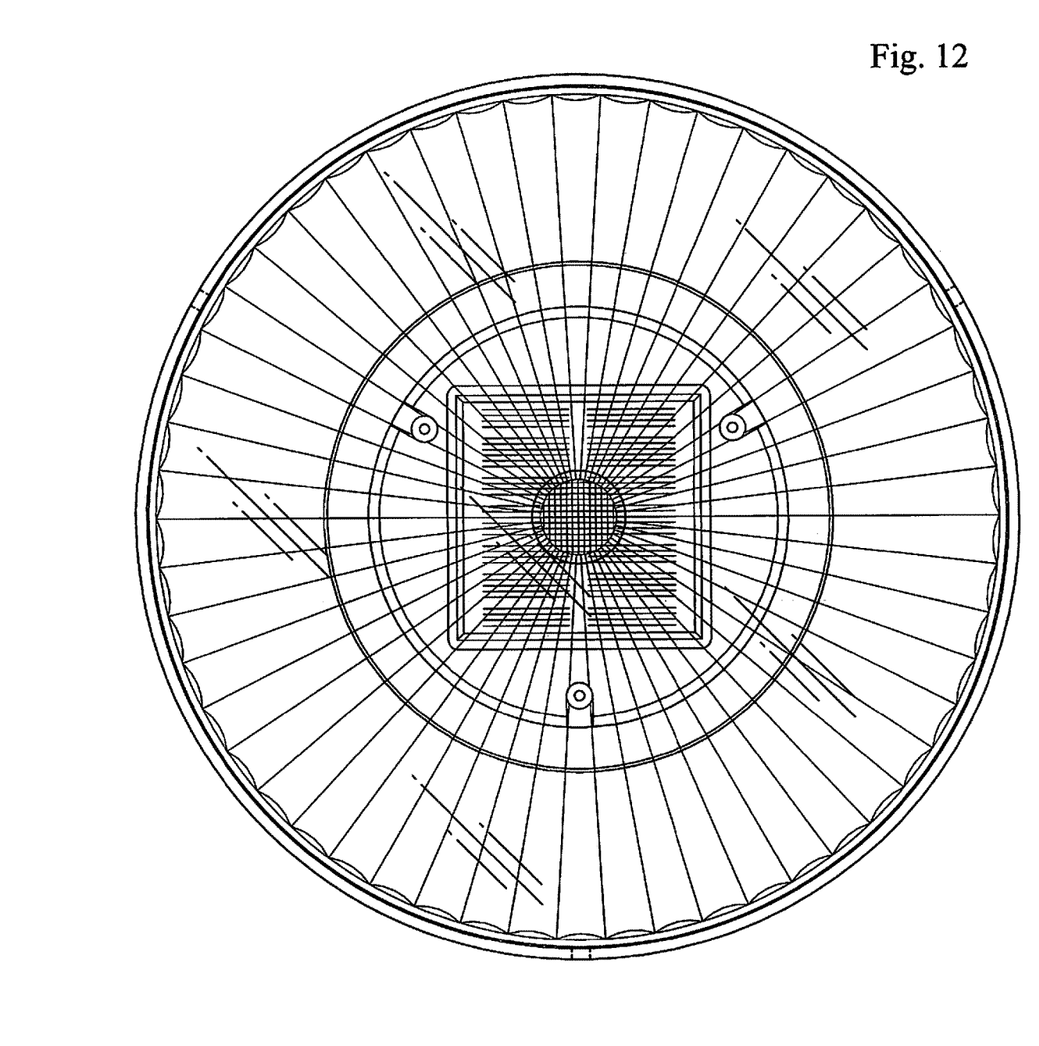
Figure 13:
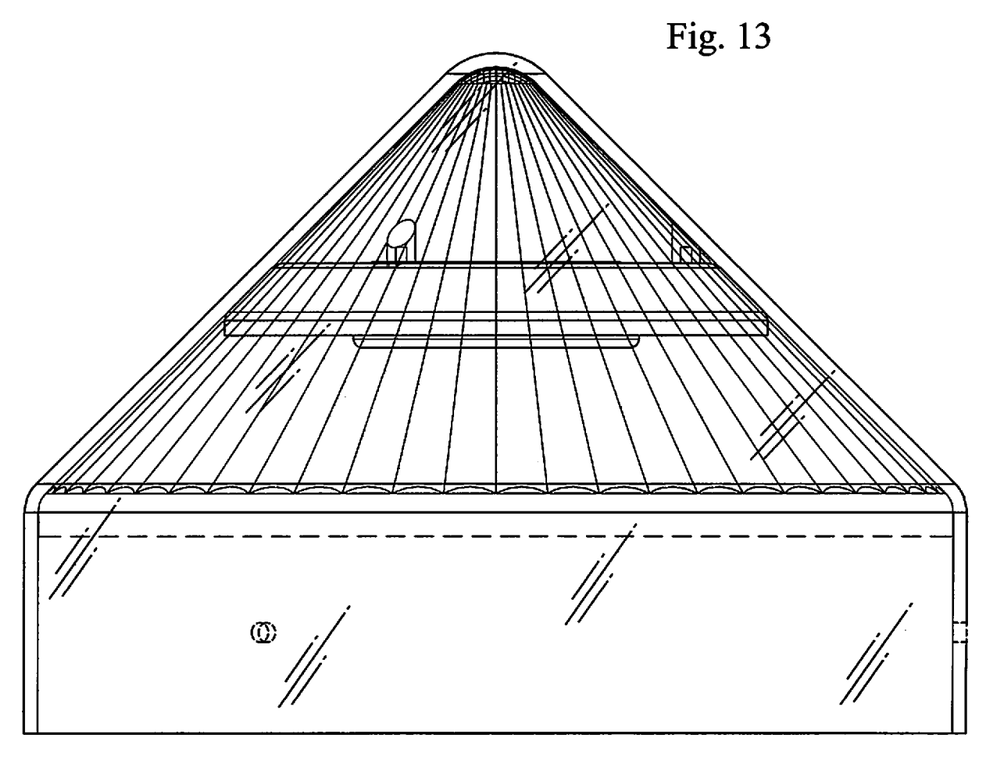

The facet cuts disperse and fracture the light to make glow, then can use a dispersion floor (in certain embodiments) to ricochet back into housing. Our facet cut housing design also provide a way to uniformly distribute the light from the LED (in certain embodiments). Preferably, the facet cuts extend to the peak of the top housing and besides aiding in the distribution output of light, also act in reverse as well for the collection of light. The angled housing also provides protection from dew and rain, as well as fracturing the light to allow collection over the entire course of the day. The facet cuts ricochet internally, allowing for solar collection even on cloudy days, with indirect sunlight. By incorporating optic dispersion into the housing, optic collection can be built into the housing. The prismatic means of collection has solved the ongoing problem of having to face a solar panel to the source for means of collection. The internal facet cuts provided with the novel guide light top housing/enclosure allow light in the housing, and once in, ricochet around until collected by the panel to convert to electricity.

Other non-limiting advantages or benefits of the novel guide light design of this design include keeping water and debris from settling on solar panel, reducing efficiency, and degrading panel.

The novel guide light provides for prismatic photovoltaic collection. In a preferred, but non-limiting, embodiment, the insertion member can fit within the interior of 2-inch PVC schedule 40 pipe, as well as 2-inch galvanized steel fence pipe.

Preferably, the center light lens captures light with diffused plastic with 75% translucency and a lithium battery for energy storage.

The novel guide light can be designed for impact resistance with upper and lower housing protruding past lens for broad impact protection (i.e. boat hit)

Though not limiting, for the electronics, the novel guide light can use mil-spec and micro-processor circuitry.

The lighting element can be one or more, LED light bulbs, such as high-powered LED lighting other LED and non-LED light bulbs can be used and are considered within the scope of the disclosure. In one non-limiting preferred embodiment, one LED bulb can be used and can extend downward from the electronics and solar panels to direct their light into the intermediate display area. Being preferably solar-powered, the guide light can be basically maintenance free and easy to install and eliminates need and concern of electrical wiring near the water. The outer enclosure can be constructed from a rugged and/or seaworthy material, to allow it to be able to preferably withstand the harsh environment of fresh and saltwater coastlines.

In one non-limiting embodiment, the durable housing can be constructed from a diffused Polycarbonate that can be both impact and U.V. resistant. In two preferred, though non-limiting, embodiments, the device can provide preferably white or blue light. Though not preferred other light colors can also be selected and are considered within the scope of the disclosure In a preferred embodiment, the device can also include a sealed Lithium polymer battery, automatic sunset on, sunrise off sensor. Accordingly, the device provides for a novel solar powered guide light which in addition to provide outdoor light also serves as a nighttime guide for boaters to aid then in centering their boats on a boat lift and can also serve as marker to warn other boaters of the existence of the boat lift which may not be visible to the boater otherwise and thus otherwise a nighttime water hazard without use of the disclosed novel guide light.

The device can be equipped and programmed for automatic "on" and "off" based on information received from a dusk/dawn sensor (i.e. light/no or not enough light sensor), once the switch is set for the desired operation. Preferably, the device can be set to a fully on when it is automatically turned on at nighttime from information received from the dusk/dawn sensor. However, other light setting can also be included such as flashing, strobing and/or other patterns in addition to be fully on and are considered within the scope of the disclosure.

The guide light can be preferably waterproof and provided with an enclosed design. In one non-limiting embodiment, the solar powered battery can last up to 20 or 25 hours before needing recharging. However, higher and lower length of battery life batteries/systems can be used and are all considered within the scope of the disclosure. The lighting system includes an automatic light sensor and provides a full 360 degrees lighting perimeter. At least the exposed to the elements components of the guide light can be constructed from marine grade materials. Preferably, the lighting system can be solar powered and uses a sealed lithium polymer battery.

The above noted top end, can include a transparent or translucent angled portion which is secured to a side wall having the internal threads (See FIG. 7—which some of the preferred 4 sets of the threads) for mating with the intermediate display. A gasket or o-ring can be provided at the intersection of the angled portion and the side wall for ensuring the watertight seal/connection between the two (See FIGS. 8 and 9).

The solar panel and light assembly electronics and battery can be secured internally within the top member by any conventional means with the solar panels disposed on an upper area of the top member.

The disclosure is not considered limited to any particular color LED bulbs and all colors or no color bulbs can be used and are considered within the scope of the disclosure. Additionally, the outer enclosure of the intermediate display area can be colored to the desired color, in lieu of using one or more colored bulbs.

Preferably, when used for centering a boat in connection with a boat lift at least two guide lights can be used (i.e. one on each side of the boat lift) so that the boater can easily steer the boat between the two lights.

Conventional wired and wireless communications/connections can be used for electronically linking and connecting the various electronic/electric components used for the lights, charging, solar collecting, and power.

In one non-limiting embodiment for the solar panel and light assembly, electricity can be generated by the solar panel and collected and stored and used for recharging the battery. In one non-limiting embodiment, the battery can be a lithium polymer type, though other batteries can be used and are all considered within the scope of the disclosure. Preferably, the battery can be charged during daylight hours. When no sunlight is present (such as at nighttime), a dusk to dawn sensor can be activated or send information to circuitry/electronics to automatically turn on the light on, using the energy from the battery. In one non-limiting preferred embodiment, the light can be one light emitting diode (LED) that can be positioned at a specific angle or extend downward from a bottom surface within the top member. Light from the preferred, but not limiting, one LED illuminates the preferred transparent/translucent intermediate display area to a desired color, which can be preferably white or blue.

At least a portion of the guide light can be constructed from an impact resistant Polycarbonate or Triton plastic material or, to preferably give a glass like appearance and clarity. However, the disclosure is not considered limited to such materials, and other materials can also be used and are considered within the disclosure. Though not limiting, it is preferred that a translucent or transparent be used for constructing at least the angled top area of the top member to allow exposure to the sun for the one or more solar panels.

The angled top area (i.e. pyramid or dome), allows the novel guide light to also act as a bird deterrent and allow rain to run off and not accumulate.

When the light is on, the novel guide light helps to light the boat lift at nighttime, which also provides security benefits to the area.

The angle top area is not considered limited to any particular angle and various angles can be selected and used.

Though the disclosed novel guide light is preferably used around a marine environment, such is not considered limiting, and all other non-marine uses for the guide light are also considered within the scope of the disclosure.

In a preferred, though non-limiting installation embodiment, prior to inserting the insertion end of the guide lite into the tube/pipe, two holes are preferably drilled into the tube/pipe. The first upper hole is for receipt of a set screw or other fastener, and the second lower hole is for ventilation. Though not considered limiting, the first upper hole can be a ⅛" hole and the second lower hole can be a 3/16" hole, though other dimensions can be used and are considered within the scope of the disclosure. Preferably, the first upper hole can be about 1" from the top of the pipe/tube and the second lower hole can be about 3½" from the top of the pipe/tube, though again other dimensions can be used and are considered within the scope of the disclosure.

The top member is unscrewed from the intermediate display member to allow access to the on/off switch. The installer than turns the switch to "ON", preferably using a switch tool, though such is not considered limiting. With the switch set to "ON", the top member is reattached to the intermediate display member. Preferably, prior to installing the guide light into the pipe/tube, the installer can cover the solar panels to ensure that the light turns on and is working properly.

To attach the guide light to the tube/pipe, the insertion member is inserted within the internal passageway of the PVC pipe or other tube. The set screw or other fastener can then be inserted in the first upper hole and then tightened to hold the guide light in place, by contacting the insertion member while not so tight so as to puncture the insertion member of the guide light. Once inserted within the pipe/tube the guide light mounts flush with the top of the pipe given the larger diameter size of the intermediate display portion as compared to the diameter of the inner passageway of the pipe/tube.

Where a permanent mount is desired, PVC or other adhesives can be used during the mounting/installation process.

Though above characteristics are provided by way of example only and are not considered limiting and other characteristics, features, ratings, dimensions, values, etc. can be used and are also considered within the scope of the disclosure.

It should be understood that the exemplary embodiments described herein should be considered in a descriptive sense only and not for purposes of limitation. Where multiple embodiments are disclosed, descriptions of features or aspects within each embodiment should typically be considered as available for other similar features or aspects in other embodiments. While one or more embodiments have been described with reference to the figures, it is understood that various changes in form and details may be made therein without departing from their spirit and scope and such changes are considered within the scope of the disclosure.

All parts/components of the guide light and their locations, wiring, solar powering means, mechanical and/or electrical communications between parts/components, attachment or securement mechanisms, dimensions, values, ratings, shapes, materials, etc. discussed above or shown in the figures, if any, are merely by way of example and are not considered limiting and other component(s) and their locations, wiring, solar powering means, mechanical and electrical communications between parts/components, attachment or securement mechanisms, dimensions, values, ratings, shapes, materials, etc. can be chosen and used and all are considered within the scope of the disclosure.

The benefits, advantages, solutions to problems, and any element(s) that may cause any benefit, advantage, or solution to occur or become more pronounced are not to be construed as a critical, required, or essential features or elements of any or all the future claims.

All components of the described system and their locations, shapes, electrical connector types, electrical communication methods, electrical stimulation methods, moving mechanisms, movement pattern, motors, dimensions, sizes, lengths, configurations, positions, securement and attachment techniques and methods, materials, etc. discussed above or shown in the drawings, if any, are merely by way of example and are not considered limiting and other component(s) and their locations, shapes, electrical connector types, electrical communication methods, electrical stimulation methods, moving mechanisms, movement pattern, motors, dimensions, sizes, lengths, configurations, positions, securement and attachment techniques and methods, materials, etc. can be chosen and used and all are considered within the scope of the disclosure.

Unless feature(s), part(s), component(s), characteristic(s) or function(s) described in the specification or shown in the drawings for a claim element, claim step or claim term specifically appear in the claim with the claim element, claim step or claim term, then the inventor does not considered such feature(s), part(s), component(s), characteristic(s) or function(s) to be included for the claim element, claim step or claim term in the claim for examination purposes and when and if the claim element, claim step or claim term is interpreted or construed, and such feature(s), part(s), components(s), characteristic(s) or function(s) should not be read into the claim, claim element, claim step or claim term. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to or described with the function of the "means for" language.

While the novel guide light has been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. A guide light adapted to securement to a vertical post, tube or other substantially vertically oriented object (collectively Post) at a top end of the Post, the Post having an opening and a perimeter edge surrounding the opening at the top end; comprising:
   a lower insertion member having an outer diameter, the outer diameter of the lower insertion member being smaller in size than an inner diameter of the opening at the top end of the Post;
   an intermediate light display member secured to the lower insertion member;
   a top enclosure adapted for securement to the intermediate light display member, the top enclosure including an angled upper member and a sidewall extending downward from the angled upper member; and
   a light assembly having at least one light bulb, the light assembly mounted within the top enclosure; and
   a rechargeable power source for energizing the light assembly, the rechargeable power source housed within the top enclosure;
   wherein in use the lower insertion member is adapted for at least partial positioning within the opening of the top end of the Post;
   wherein during nighttime conditions when the light assembly is on the light from the at least one light bulb is visible within the intermediate light display and serves a marker for the Post or an object that the Post is secured to.

2. The guide light of claim 1 wherein the angled upper member is transparent or translucent.

3. The guide light of claim 2 wherein the angled upper member has a plurality of facet cuts which provide for prismatic reflection of sun rays for solar collection 180 degrees across a horizon.

4. The guide light of claim 1 wherein the at least one light bulb is at least one LED light bulb that extends downward when the light assembly is mounted within the top enclosure.

5. The guide light of claim 1 wherein the rechargeable power source is a rechargeable battery.

6. The guide light of claim 1 further comprising a light sensor in communication with the light assembly; wherein information from the light sensor is used to determine when to automatically turn on the at least one light bulb by the light assembly.

7. The guide light of claim 1 wherein the sidewall of the top enclosure is threadedly secured to an upper edge of the intermediate display member.

8. The guide light of claim 1 wherein an outer diameter of the intermediate display member being larger in size than an outer diameter of the lower insertion member to define a bottom surface for the intermediate display member, wherein in use with the lower insertion member positioned within the opening of the top end of the Post the bottom surface of the intermediate display member contacts the perimeter edge of the Post.

9. The guide light of claim 1 wherein the at least one light bulb is at least one LED light bulb that extends downward from a bottom surface of the light assembly when the light assembly is mounted within the top enclosure; wherein in use the at least one LED light bulb is hidden from view by the sidewall of the top enclosure.

10. The guide light of claim 1 wherein the light assembly including solar recharging circuitry for recharging the rechargeable power source and one or more solar panels for collecting energy from the sun during daytime conditions which is converted to energy for recharging the rechargeable power source; wherein the one or more solar panels are disposed on an upper surface of the light assembly; wherein the prismatic reflection gathers the sun rays and focuses the sun rays to the one or more solar panels.

11. A guide light adapted to securement to a vertical post, tube or other substantially vertically oriented object (collectively Post) at a top end of the Post, the Post having an opening and a perimeter edge surrounding the opening at the top end; comprising:
   a lower insertion member having an outer diameter, the outer diameter of the lower insertion member being smaller in size than an inner diameter of the opening at the top end of the Post;
   an intermediate light display member secured to the lower insertion member;
   a top enclosure adapted for securement to the intermediate light display member, the top enclosure including a transparent or translucent angled upper member and a sidewall extending downward from the angled upper member, the angled upper member has a plurality of facet cuts which provide for prismatic reflection of sun rays for solar collection 180 degrees across a horizon; and
   a light assembly having at least one LED light bulb, the light assembly mounted within the top enclosure; and
   a rechargeable battery for energizing the light assembly, the rechargeable power source housed within the top enclosure;
   wherein in use the lower insertion member is adapted for at least partial positioning within the opening of the top end of the Post;
   wherein during nighttime conditions when the light assembly is on the light from the at least one LED light bulb is visible within the intermediate light display and serves a marker for the Post or an object that the Post is secured to;
   wherein at least a portion of the intermediate light display constructed from a material allowing the light from the at least one LED light bulb to be seen by a person externally located from the guide light.

12. The guide light of claim 11 wherein the at least one LED light bulb extends downward when the light assembly is mounted within the top enclosure; wherein in use the at least one LED light bulb is hidden from view by the sidewall of the top enclosure.

13. The guide light of claim 11 wherein the light assembly including solar recharging circuitry for recharging the rechargeable power source and one or more solar panels for collecting energy from the sun which is converted to energy for recharging the rechargeable battery; wherein the one or more solar panels are disposed on an upper surface of the light assembly; wherein the prismatic reflection gathers the sun rays and focuses the sun rays to the one or more solar panels.

14. The guide light of claim 11 further comprising a light sensor in communication with the light assembly; wherein information from the light sensor is used to determine when to automatically turn on the at least one light bulb by the light assembly.

15. The guide light of claim 11 wherein the sidewall of the top enclosure is threadedly secured to an upper edge of the intermediate display member.

16. The guide light of claim 11 wherein an outer diameter of the intermediate display member being larger in size than an outer diameter of the lower insertion member to define a bottom surface for the intermediate display member, wherein in use with the lower insertion member positioned within the opening of the top end of the Post the bottom surface of the intermediate display member contacts the perimeter edge of the Post.

17. A guide light adapted to securement to a vertical post, tube or other substantially vertically oriented object (collectively Post) at a top end of the Post, the Post having an opening and a perimeter edge surrounding the opening at the top end; comprising:
  a lower insertion member having an outer diameter, the outer diameter of the lower insertion member being smaller in size than an inner diameter of the opening at the top end of the Post;
  an intermediate light display member secured to the lower insertion member;
  a top enclosure adapted for securement to the intermediate light display member, the top enclosure including a transparent or translucent angled upper member and a sidewall extending downward from the angled upper member, the angled upper member has a plurality of facet cuts which provide for prismatic reflection of sun rays for solar collection 180 degrees across a horizon; and
  a light assembly having at least one LED light bulb, the light assembly mounted within the top enclosure, the at least LED light bulb extends downward when the light assembly is mounted within the top enclosure and is hidden from view by the sidewall of the top enclosure; and
  a rechargeable battery for energizing the light assembly, the rechargeable power source housed within the top enclosure;
  wherein in use the lower insertion member is adapted for at least partial positioning within the opening of the top end of the Post;
  wherein during nighttime conditions when the light assembly is on the light from the at least one light bulb is visible within the intermediate light display and serves a marker for the Post or an object that the Post is secured to;
  wherein an outer diameter of the intermediate display member being larger in size than an outer diameter of the lower insertion member to define a bottom surface for the intermediate display member, wherein in use with the lower insertion member positioned within the opening of the top end of the Post the bottom surface of the intermediate display member contacts the perimeter edge of the Post;
  wherein at least a portion of the intermediate light display constructed from a material allowing the light from the at least one LED light bulb to be seen by a person externally located from the guide light.

18. The guide light of claim 17 wherein the light assembly including solar recharging circuitry for recharging the rechargeable power source and one or more solar panels for collecting energy from the sun which is converted to energy for recharging the rechargeable battery; wherein the one or more solar panels are disposed on an upper surface of the light assembly; wherein the prismatic reflection gathers the sun rays and focuses the sun rays to the one or more solar panels.

19. The guide light of claim 17 further comprising a light sensor in communication with the light assembly; wherein information from the light sensor is used to determine when to automatically turn on the at least one light bulb by the light assembly.

20. The guide light of claim 17 wherein the sidewall of the top enclosure is threadedly secured to an upper edge of the intermediate display member.

\* \* \* \* \*